(12) United States Patent
Otto et al.

(10) Patent No.: US 10,041,498 B2
(45) Date of Patent: Aug. 7, 2018

(54) THREE SPOOL GEARED TURBOFAN WITH LOW PRESSURE COMPRESSOR DRIVE GEAR SYSTEM AND MECHANICAL CONTROLLER

(71) Applicant: United Technologies Corporation, Hartford, CT (US)

(72) Inventors: John R. Otto, Middletown, CT (US); James B. Coffin, Windsor, CT (US); Jason Husband, South Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 382 days.

(21) Appl. No.: 14/912,105

(22) PCT Filed: Aug. 21, 2014

(86) PCT No.: PCT/US2014/051990
§ 371 (c)(1),
(2) Date: Feb. 15, 2016

(87) PCT Pub. No.: WO2015/031143
PCT Pub. Date: Mar. 5, 2015

(65) Prior Publication Data
US 2016/0195096 A1 Jul. 7, 2016

Related U.S. Application Data

(60) Provisional application No. 61/871,770, filed on Aug. 29, 2013.

(51) Int. Cl.
*F02K 3/06* (2006.01)
*F04D 25/04* (2006.01)
(Continued)

(52) U.S. Cl.
CPC ............ *F04D 25/045* (2013.01); *F01D 5/02* (2013.01); *F01D 15/12* (2013.01); *F02C 3/107* (2013.01);
(Continued)

(58) Field of Classification Search
CPC ...... F04D 25/028; F04D 27/004; F01D 15/12; F05D 2260/40311; F02C 3/107; F02K 3/06
USPC .......................................... 415/122.1, 124.1
See application file for complete search history.

(56) References Cited

U.S. PATENT DOCUMENTS 3,853,432 A 12/1974 Cronstedt
4,909,031 A 3/1990 Grieb
(Continued)

FOREIGN PATENT DOCUMENTS

EP 1553276 7/2005
EP 2009269 12/2008

OTHER PUBLICATIONS

European Search Report European Application No. 14839045.3 dated Mar. 15, 2017.
(Continued)

*Primary Examiner* — Kevin Murphy
(74) *Attorney, Agent, or Firm* — Carlson, Gaskey & Olds P.C.

(57) ABSTRACT

A turbofan engine is disclosed that includes a fan rotatable about an axis, a compressor section including a high pressure compressor, a medium pressure compressor and a low pressure compressor and a turbine section including a high pressure turbine, an intermediate turbine and a fan drive turbine. A fan drive gear system is driven by the fan drive turbine for driving the fan. A compressor drive gear system is driven by the intermediate turbine for driving the low pressure compressor. A gear controller controls rotation of at least one of the fan drive gear system and the compressor drive gear system relative to a static structure to vary an effective speed reduction ratio of one of the fan drive gear system and the compressor drive gear system.

17 Claims, 2 Drawing Sheets

(51) Int. Cl.
  *F02C 3/107* (2006.01)
  *F01D 5/02* (2006.01)
  *F01D 15/12* (2006.01)
  *F04D 25/02* (2006.01)
  *F04D 27/00* (2006.01)
  *F04D 29/32* (2006.01)
  *F02C 7/36* (2006.01)

(52) U.S. Cl.
  CPC ............... *F02C 7/36* (2013.01); *F02K 3/06* (2013.01); *F04D 25/028* (2013.01); *F04D 27/004* (2013.01); *F04D 29/321* (2013.01); *F05D 2220/32* (2013.01); *F05D 2260/40311* (2013.01); *F05D 2270/02* (2013.01)

(56) References Cited

U.S. PATENT DOCUMENTS

| | | |
|---|---|---|
| 8,297,916 B1 | 10/2012 | McCune et al. |
| 8,425,372 B2 | 4/2013 | Lemmers, Jr. |
| 2008/0098717 A1 | 5/2008 | Orlando et al. |
| 2008/0149445 A1 | 6/2008 | Kern et al. |
| 2009/0074565 A1 | 3/2009 | Suciu et al. |
| 2011/0305572 A1* | 12/2011 | Bellis .................... B64C 11/306 416/129 |
| 2012/0015776 A1* | 1/2012 | Lemmers, Jr. ........ F01D 21/006 475/271 |
| 2013/0000323 A1 | 1/2013 | Kupratis |
| 2013/0004297 A1 | 1/2013 | Sheridan |
| 2013/0192200 A1 | 8/2013 | Kupratis et al. |

OTHER PUBLICATIONS

U.S. Appl. No. 61/843,427, filed Jul. 7, 2013 entitled Fan Gear System Mechanical Controller.
International Search Report and Written Opinion for International Application No. PCT/US2014/051990 dated Dec. 18, 2014.
International Preliminary Report on Patentability for International Application No. PCT/US2014/051990 dated Mar. 10, 2016.

* cited by examiner

THREE SPOOL GEARED TURBOFAN WITH LOW PRESSURE COMPRESSOR DRIVE GEAR SYSTEM AND MECHANICAL CONTROLLER

REFERENCE TO RELATED APPLICATION

This application claims priority to U.S. Provisional Application No. 61/871,770 filed on Aug. 29, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The compressor section may include low, intermediate and high pressure compressors, and the turbine section can include low, intermediate and high pressure turbines. The high pressure turbine drives the high pressure compressor through an outer shaft to form a high spool. The intermediate turbine drives an intermediate compressor and forms an intermediate spool and the low pressure turbine drives the low pressure compressor through an inner shaft to form a low spool.

The fan section may also be driven by the low spool. In a direct drive gas turbine engine includes a fan section driven by the low spool such that the low pressure compressor, low pressure turbine and fan section rotate at a common speed in a common direction. In some 3-spool gas turbine configurations, the low pressure compressor is driven by the intermediate turbine and the low pressure turbine is utilized only to drive the fan section. The separation of the low pressure compressor form the low pressure turbine provides for rotation at different more efficient speeds.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Although geared architectures have improved propulsive efficiency, turbine engine manufacturers continue to seek further improvements to engine performance including improvements to thermal, transfer and propulsive efficiencies.

SUMMARY

A turbofan engine according to an exemplary embodiment of this disclosure, among other possible things includes a fan, a compressor section including a first compressor, and a second compressor, a turbine section including a first turbine, a second turbine, and a third turbine, a plurality of gear systems including a first gear system and a second gear system. The first turbine drives the first compressor through the first gear system, and the second turbine drives the second compressor through the second gear system. The engine further comprises a gear controller for controlling rotation of at least one of the plurality of gear systems relative to a static structure, thereby varying an effective engine speed reduction ratio.

In a further embodiment of the above turbofan engine, the first gear system and the second gear system each includes a sun gear, a plurality of planet gears and a ring gear circumscribing the plurality of planet gears.

In a further embodiment of the above turbofan engine, a low shaft is driven by the first turbine drives the sun gear of the first gear system and an intermediate shaft driven by the second turbine drives the sun gear of the second gear system. The plurality of planet gears rotate about a corresponding plurality of fixed axes and the first gear system ring gear is coupled to the fan and the second gear system ring gear is coupled to the second compressor.

In a further embodiment of the above turbofan engine, the first compressor is coupled to the first gear system ring gear.

In a further embodiment of the above turbofan engine, the first gear system is coupled to a portion of the second gear system.

In a further embodiment of the above turbofan engine, the gear controller is coupled to the second compressor and controls rotation of the second gear system through the second compressor.

In a further embodiment of the above turbofan engine, the gear controller is coupled to a carrier of the second gear system for controlling rotation of the carrier relative to a static structure.

In a further embodiment of the above turbofan engine, the gear controller varies the effective speed reduction of both the first gear system and the second gear system.

In a further embodiment of the above turbofan engine, increasing a speed of rotation of the carrier relative to the static structure reduces the effective speed reduction to increase a speed of both the second compressor and the fan.

In a further embodiment of the above turbofan engine, decreasing a speed of rotation of the carrier relative to the static structure increases the effective speed reduction to decrease a speed of both the second compressor and the fan.

In a further embodiment of the above turbofan engine, the first gear system and the second gear system includes a gear reduction in a static condition greater than about 2.3.

A method of controlling a turbofan engine according to an exemplary embodiment of this disclosure, among other possible things, includes coupling a fan rotatable about an axis to a first turbine through a first gear system such that the fan rotates at a speed slower than the first turbine, coupling a second compressor section to a second turbine through a second gear system such that the second compressor section rotates at a speed slower than the second turbine, and controlling rotation of at least one of the first gear system and the second gear system relative to a fixed structure with a gear controller to vary an effective speed reduction ratio.

In a further embodiment of the above method of controlling a turbofan engine, includes coupling the first gear system to the second gear system to vary the effective speed reduction of both the first gear system and the second gear system.

In a further embodiment of the above method of controlling a turbofan engine, includes coupling the gear controller to the second compressor section and varying the effective speed reduction ratio of both the first gear system and the second gear system through the second compressor section.

In a further embodiment of the above method of controlling a turbofan engine, includes coupling the gear controller to a portion of the second gear system for varying the effective speed reduction ration of both the first gear system and the second gear system.

In a further embodiment of the above method of controlling a turbofan engine, includes reducing the effective speed reduction ratio by increasing a speed of rotation relative to a static structure of the second gear system and the first gear system.

In a further embodiment of the above method of controlling a turbofan engine, includes increasing the effective speed reduction ratio by decreasing a speed of rotation relative to a static structure of the second gear system and the first gear system.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
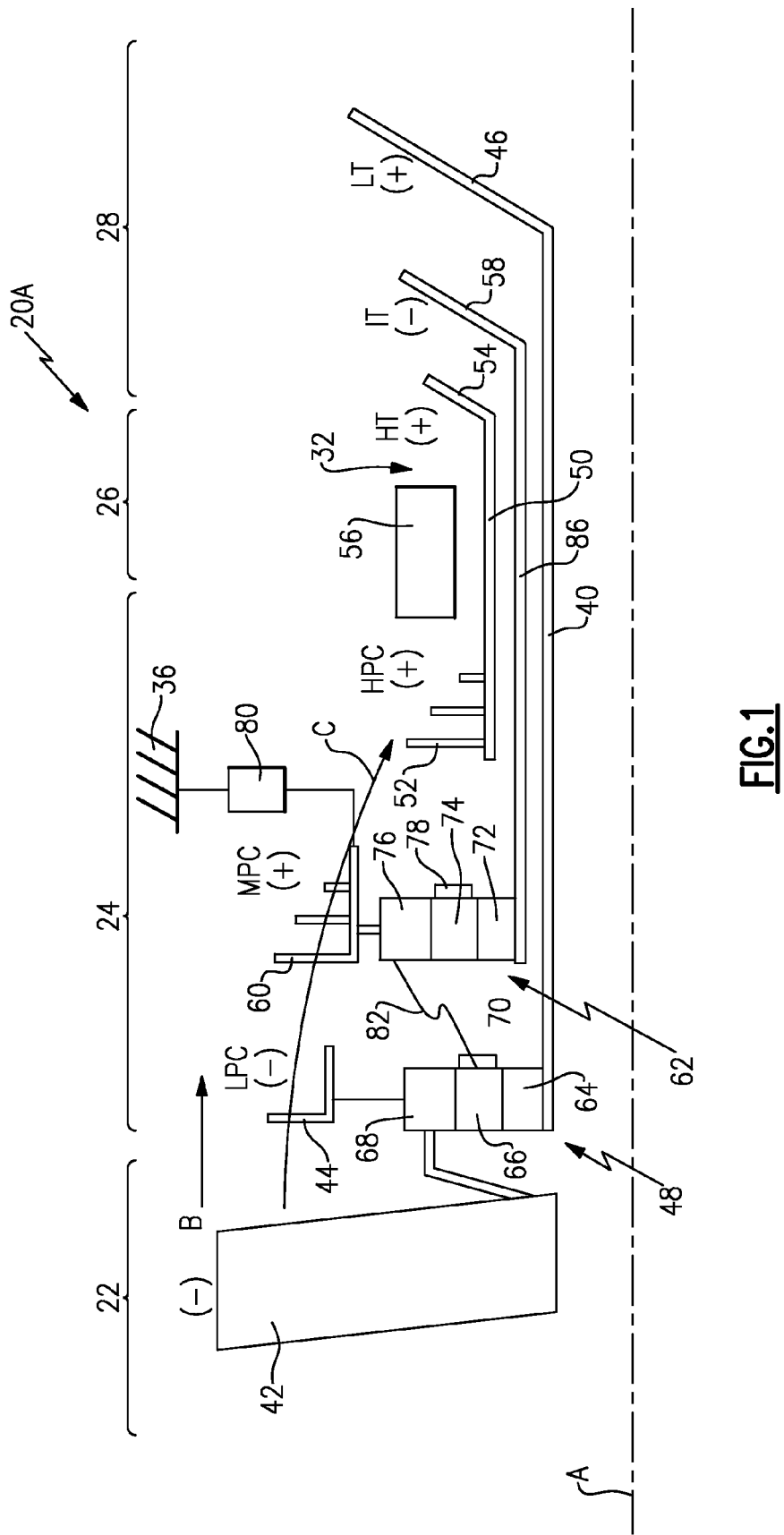
FIG. 1 is a schematic view of an example three spool gas turbine engine.

FIG. 1 schematically illustrates an example gas turbine engine 20A that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high energy exhaust gas stream that expands through the turbine section 28 where energy is extracted and utilized to drive the fan section 22 and the compressor section 24.

The example engine 20A generally includes a first, low pressure turbine 46 driving an inner shaft 40, a second, intermediate pressure turbine 58 driving an intermediate shaft 86 and a third, high pressure turbine 54 driving an outer shaft 50 mounted for rotation about an engine central longitudinal axis A relative to an engine static structure 36. The outer shaft 50 is coupled to a high pressure compressor 52 to form a high spool 32.

The low pressure turbine 46 drives inner shaft 40 that in turn drives the fan 42 through a speed change device, such as a first, fan drive gear system 48, to drive the fan 42 at a lower speed than a first, low pressure turbine 46. Accordingly, the low pressure turbine 46 is also referred to as the fan drive turbine. The example intermediate pressure turbine 58 drives a second, compressor drive gear system 62 that in turn drives a second, medium pressure compressor 60. A combustor 56 is arranged between the high pressure compressor 52 and the high pressure turbine 54.

In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine. Similarly, the "intermediate pressure" turbine encounters a pressure less than that of the high pressure turbine and greater than that of the low pressure turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

Airflow through the core airflow path C is compressed by the low pressure compressor 44, the medium pressure compressor 60 and then by the high pressure compressor 52 mixed with fuel and ignited in the combustor 56 to produce high energy exhaust gases that expand through the high pressure turbine 54, intermediate turbine 58 and low pressure turbine 46.

The disclosed gas turbine engine 20 in one example is a high-bypass geared aircraft engine. In a further example, the gas turbine engine 20 includes a bypass ratio greater than about six (6), with an example embodiment being greater than about ten (10). The fan drive gear system 48 is an epicyclical gear train, such as a planetary gear system, star gear system or other known gear system, with a gear reduction ratio of greater than about 2.3. Moreover, the compressor drive gear system 62 may also include a gear reduction ratio of greater than about 2.3

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by airflow through the bypass flow path B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades.

The example gas turbine engine 20a includes the turbine section 28 that has the intermediate turbine 58 that drives the compressor drive gear system 62. The low pressure turbine 46 drives the fan drive gear system 48 through the inner shaft 40.

The fan drive gear system 48 includes a sun gear 64 that drives a plurality of planet gears 66 circumscribed by a ring gear 68. The planet gears 66 are supported by a carrier 70 that is rotatable about the axis A. The ring gear 68 drives the fan 42 through a fan shaft 34. The ring gear 68 also drives the low pressure compressor 44. This configuration of the fan drive gear system 48 is referred to as a planet gear system. In this example the low pressure compressor 44 is driven at a speed common with the fan 42. The example low pressure compressor operates as a booster compressor to provide an initial compression of incoming airflow that is then directed to medium pressure compressor 60.

The intermediate turbine 58 drives the compressor drive gear system 62 such that the medium pressure compressor 60 will rotate at a speed different than the intermediate turbine 58. Because the low pressure compressor 44 can be rotated at a speed different than the intermediate turbine, each of the intermediate turbine 58 and the low pressure compressor 44 can be configured to rotate at optimal speeds for each purpose. In other words, the medium pressure compressor 44 can be driven at a speed that provides the most efficient work on the incoming core flow C and the intermediate turbine 58 can be driven at a speed providing optimal turbine efficiency.

In this example, the compressor drive gear system 62 includes a sun gear 70 that drives a plurality of planet gears 72 circumscribed by a ring gear 74. The ring gear 74 is coupled to the medium pressure compressor 60. The plurality of planet gears 74 are supported by a carrier 78 that is rotatable about the axis A. This configuration of the compressor drive gear system 62 is referred to as a star gear system.

The carrier 70 of the fan drive gear system 48 is coupled to the ring gear of the compressor drive gear system 62 through a coupling 82. The coupling 82 operates to rotate the carrier 70 at a speed substantially common with the speed of the ring gear 76. The coupling 82 is flexible to accommodate relative movement between the fan drive gear system 48 and the compressor drive gear system 62.

The fan drive gear system 48 and the compressor drive gear system 62 are separately configured to provide different gear ratios to optimize relative speeds. Accordingly, the low pressure turbine 46 can be optimized to increase efficiency to drive the fan 42 and the low pressure compressor 44 through the fan drive gear system 48.

The intermediate turbine 58 drives the medium pressure compressor 60 through the compressor drive gear system 62 that provides for an optimization of both the intermediate turbine 58 and the medium pressure compressor 60.

A gear system that is fixed to the static engine structure 36 provides only a single speed reduction according to the fixed gear ratio. The example fan drive gear system 48 and the compressor drive gear system 62 are grounded to the engine static structure through a gear controller 80. The gear controller 80 provides for and controls relative rotation of both the fan drive gear system 48 and the compressor drive gear system 62 relative to the static structure 36 and corresponding shafts 40 and 86. Rotation of the gear system 48, 62 provides for a variation in the speed reduction provided by each of the gear system 48, 62.

In this example, the gear controller 80 is coupled to compressor drive gear system 62 through the medium pressure compressor 60 and the ring gear 76. The ring gear 70 is in turn coupled through coupling 82 to the carrier 70 supporting rotation of planet gears 66 of the fan drive gear system 48. Accordingly, control of rotation of the medium pressure compressor 60 operates to control rotation of the carrier 70 of the fan drive gear system 48.

Input from the intermediate turbine 58 rotates the sun gear 72 that in turn drives the star gears 74 and the ring gear 76. The speed reduction provided is dictated by the relationship between the sun gear 72, star gears 74 and ring gear 76 when a portion of the compressor gear system 62 is fixed relative to the static structure 36. However, in this example, the compressor gear system 62 rotates about the axis A with the intermediate shaft 86. The gear controller 80 exerts a resistance that slows rotation of the compressor gear system 62 relative to rotation of the intermediate shaft 86 to define an effective speed reduction that is less than the speed reduction provided by the compressor gear system 62 in a fixed mounting.

A reduction in the speed reduction provides for a faster rotation of the medium pressure compressor 60 relative to the shaft 86. An increase in speed reduction provides a slower rotation of the medium pressure compressor 60 relative to the intermediate shaft 86.

The gear controller 80 exerts a resistance to rotation of the medium pressure compressor 60 that in turn slows rotation of the ring gear 76. The ring gear 76 is coupled to the carrier 70 of the fan drive gear system 48 and therefore slows rotation of the carrier 70. Slowing rotation of the carrier 70 provides for an increase in speed reduction such that the fan 42 and the low pressure compressor 44 rotate at a lower speed relative to the inner shaft 40. Increasing rotation of the carrier 70 reduces the speed reduction and results in the fan 42 and low pressure compressor 44 turning at an increased speed relative to the inner shaft 40.

Resistance generated by the gear controller 80 can result in a slowing of the intermediate turbine 58 and low pressure turbine 46. Resistance or an increase in load exerted by the controller 80 varies the relative rotation of both the fan drive gear system 48 and the compressor drive gear system 62 that can result in a slowing of the corresponding intermediate turbine 58 and low pressure turbine 46.

In operation, the low pressure turbine 46 rotates in a first direction indicated by "+" and drives the sun gear 64 of the fan drive gear system 48. The example fan drive gear system 48 is a planetary epicyclic gear and therefore drives the fan 42 and the low pressure compressor 44 in a second direction indicated as "−" opposite the first direction. The intermediate turbine 58 rotates in the second direction "−" and drives the compressor gear system 62 such that it drives the medium pressure compressor 60 in the first direction "+".

The gear controller 80 exerts a load on the medium pressure compressor 60 that is in addition to the aerodynamic loads exerted by airflow through the core airflow path C. The additional loads exerted by the gear controller 80 on the medium pressure compressor 60 changes the speed at which the ring gear 76 of the compressor gear system 62 rotates to control the effective speed reduction.

The coupling 82 drives rotation of the carrier 70 about the axis A and results in an effective speed reduction that is less than would be provided should carrier 70 be fixed. Changes in loads provided by the gear controller 80 varies the effective speed reduction provided by the fan drive gear system 48 to vary the speed of the fan 42 relative to the static structure 36 and the low shaft 46.

The gear controller 82 can be an electric generator with a controlled load to vary resistance to rotation of the medium pressure compressor. The gear controller 82 may also be a hydraulic pump that utilizes a variable orifice to vary the loads exerted on the gear system 48 and 62 to control the effective speed reduction.

Figure 2:
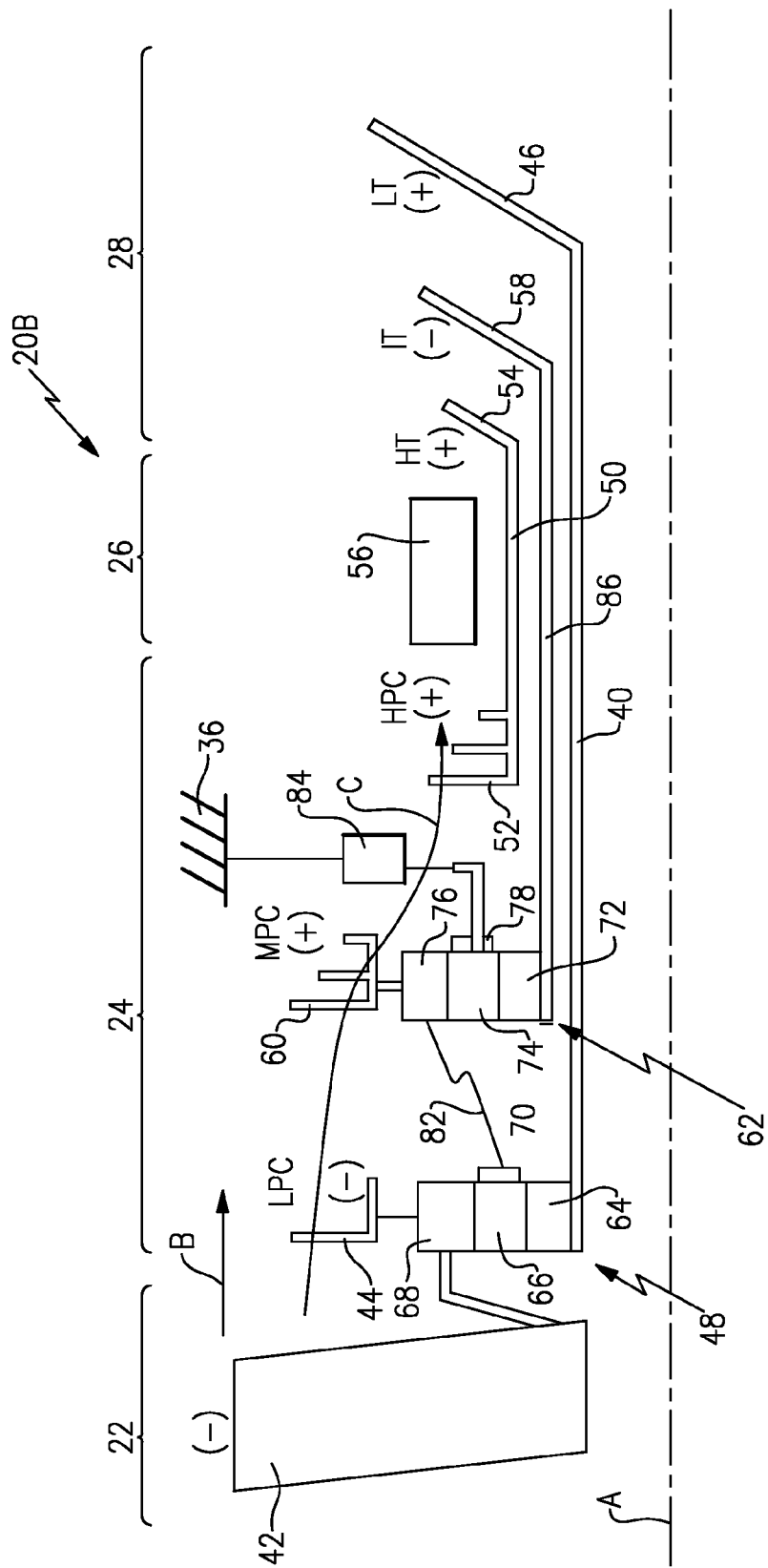
FIG. 2 is another example of a three spool gas turbine engine.

Referring to FIG. 2, another example gas turbofan engine 20B includes the fan drive gear system 48 and the compressor drive gear system 62. In this example, the fan drive gear system 48 is a planet system and the compressor drive gear system 62 is a star gear system.

The carrier 78 of the compressor drive gear system 62 is grounded to the static structure 36 through a gear controller 84. The gear controller 84 can be an electric motor or hydraulic pump that provides a controlled variable resistance to rotation of the carrier 78. Moreover, the gear controller 84 may be any structure that provides a variable and controllable resistance to rotation of the carrier 78.

In operation, the intermediate turbine 58 drives the sun gear 72 of the compressor drive gear system 62. The sun gear 72 in turn drives the star gears 74 supported by the carrier 78. The carrier 78 is rotatable about the axis A that is controlled by the gear controller 84. The ring gear 76 is coupled to the carrier 70 of the fan drive gear system 48 to drive the carrier 70 at a speed common with the ring gear 76 and medium pressure compressor 60. Because the gear controller 84 is coupled to the carrier 78, it can vary resistance and thereby rotation of the carrier 78 between a fixed position that provides a speed reduction according to the gear system ratio and a substantially open position where the carrier is free to rotate closer to the speed of the intermediate shaft 58.

Accordingly, the effective speed reduction of the compressor drive gear system 62 may increase from a greatest speed reduction set by the gear configuration to a lower speed reduction such that the medium pressure compressor 60 is driven at a faster speed relative to the intermediate shaft 58.

The fan drive gear system 48 operates at an effective speed reduction that is less than that provided by the gear configuration because the carrier 70 is driven by the coupling 82 that is in turn driven by the ring gear 76 of the compressor drive gear system 62.

An increase in a speed of the ring gear 76 provides a corresponding increase in rotational speed of the carrier 70. Increasing the speed of the carrier 70 reduces the speed reduction provided by the fan drive gear system 48 such that the fan 42 and the low pressure compressor 44 rotate at an increased speed relative to the low pressure turbine 46.

During engine operation, speeds of the fan 42, low pressure compressor 44 and medium pressure compressor 60 are varied to tailor performance to current conditions and/or provide a desired engine output. Higher fan speeds can be provided by reducing the resistance to rotation generated by the gear controller 84. A reduced load on the carrier 78 allows the carrier 78 to rotate at an increased speed relative to the static structure and the intermediate shaft 58. The increased speed provides for a further increase in a speed of the medium pressure compressor 60. The increased speed is transmitted through the coupling 82 to turn the carrier 70 faster. Rotating the carrier 70 of the fan drive gear system 48 faster reduces the effective speed reduction resulting in an increase in fan speed. The increase in fan speed can provide performance enhancements over a set speed that cannot vary during an operational cycle.

An increase in resistance and/or load provided by the gear controller 84 slows rotation of the carrier 78 relative to the static structure 36 and the intermediate turbine 58. The slowed rotation 78 provides an increase in the effective speed reduction such that the medium pressure compressor 60 slows. Slowing of the medium pressure compressor 60 also slows rotation of the ring gear and coupling 82 to further slow rotation of the carrier 70. Slowing rotation of the carrier 70 increases the speed reduction provided by the fan drive gear system 48 to slow the fan 42 and the low pressure compressor 44.

Adjustments to the resistance and loads provided by the gear controller 84 can be set at discrete operating points or vary infinitely within a defined range to tailor engine operation to current conditions and desired performance.

Each of the disclosed example three spool turbofan engine configurations includes a variable fan drive gear system 48 coupled to a variable compressor drive gear system 62. The variable compressor and fan drive gear systems 623, 48 provide for the optimization of the corresponding turbine section and the corresponding compressor and fan sections. Accordingly, each of the turbine sections that drive a corresponding fan and low pressure compressor can be optimized to rotate at an increased efficiency level while the corresponding compressor gear system and fan drive gear system allow the corresponding compressor and fan to be rotated at closer to their optimal speeds to further improve overall engine propulsive thrust and efficiency.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbofan engine comprising:
   a fan;
   a compressor section including: a first compressor; and a second compressor;
   a turbine section including: a first turbine; a second turbine; and a third turbine;
   a plurality of gear systems, including: a first gear system; and a second gear system;
   wherein the first turbine drives the first compressor through the first gear system, and the second turbine drives the second compressor through the second gear system; and
   the engine further comprises a gear controller for controlling rotation of at least one of the plurality of gear systems relative to a static structure, thereby varying an effective engine speed reduction ratio.

2. The turbofan engine as recited in claim 1, wherein the first gear system and the second gear system each includes a sun gear, a plurality of planet gears and a ring gear circumscribing the plurality of planet gears.

3. The turbofan engine as recited in claim 2, wherein a low shaft driven by the first turbine drives the sun gear of the first gear system and an intermediate shaft driven by the second turbine drives the sun gear of the second gear system and the plurality of planet gears rotate about a corresponding plurality of fixed axes and the first gear system ring gear is coupled to the fan and the second gear system ring gear is coupled to the second compressor.

4. The turbofan engine as recited in claim 3, wherein the first compressor is coupled to the first gear system ring gear.

5. The turbofan engine as recited in claim 1, wherein the first gear system is coupled to a portion of the second gear system.

6. The turbofan engine as recited in claim 5, wherein the gear controller is coupled to the second compressor and controls rotation of the second gear system through the second compressor.

7. The turbofan engine as recited in claim 5, wherein the gear controller is coupled to a carrier of the second gear system for controlling rotation of the carrier relative to a static structure.

8. The turbofan engine as recited in claim 1, wherein the gear controller varies the effective speed reduction of both the first gear system and the second gear system.

9. The turbofan engine as recited in claim 7, wherein increasing a speed of rotation of the carrier relative to the static structure reduces the effective speed reduction to increase a speed of both the second compressor and the fan.

10. The turbofan engine as recited in claim 7, wherein decreasing a speed of rotation of the carrier relative to the static structure increases the effective speed reduction to decrease a speed of both the second compressor and the fan.

11. The turbofan engine as recited in claim 1, wherein the first gear system and the second gear system includes a gear reduction in a static condition greater than about 2.3.

12. A method of controlling a turbofan engine comprising:
coupling a fan rotatable about an axis to a first turbine through a first gear system such that the fan rotates at a speed slower than the first turbine;
coupling a second compressor section to a second turbine through a second gear system such that the second compressor section rotates at a speed slower than the second turbine; and
controlling rotation of at least one of the first gear system and the second gear system relative to a fixed structure with a gear controller to vary an effective speed reduction ratio.

13. The method as recited in claim 12, coupling the first gear system to the second gear system to vary the effective speed reduction of both the first gear system and the second gear system.

14. The method as recited in claim 13, including coupling the gear controller to the second compressor section and varying the effective speed reduction ratio of both the first gear system and the second gear system through the second compressor section.

15. The method as recited in claim 14, including coupling the gear controller to a portion of the second gear system for varying the effective speed reduction ration of both the first gear system and the second gear system.

16. The method as recited in claim 12, including reducing the effective speed reduction ratio by increasing a speed of rotation relative to a static structure of the second gear system and the first gear system.

17. The method as recited in claim 12, including increasing the effective speed reduction ratio by decreasing a speed of rotation relative to a static structure of the second gear system and the first gear system.

\* \* \* \* \*